(12) United States Patent
Guo et al.

(10) Patent No.: US 12,317,339 B2
(45) Date of Patent: May 27, 2025

(54) SECURITY PROTECTION ON USER CONSENT FOR EDGE COMPUTING

(71) Applicant: Apple Inc., Cupertino, CA (US)

(72) Inventors: Shu Guo, Beijing (CN); Dawei Zhang, Saratoga, CA (US); Fangli Xu, Beijing (CN); Haijing Hu, Los Gatos, CA (US); Huarui Liang, Beijing (CN); Mona Agnel, Guildford (GB); Ralf Rossbach, Munich (DE); Sudeep Manithara Vamanan, Nuremberg (DE); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 17/593,422

(22) PCT Filed: Sep. 16, 2020

(86) PCT No.: PCT/CN2020/115610
§ 371 (c)(1),
(2) Date: Sep. 17, 2021

(87) PCT Pub. No.: WO2022/056733
PCT Pub. Date: Mar. 24, 2022

(65) Prior Publication Data
US 2022/0304079 A1    Sep. 22, 2022

(51) Int. Cl.
*H04W 76/10* (2018.01)
*H04W 8/02* (2009.01)
(Continued)

(52) U.S. Cl.
CPC ............. *H04W 76/10* (2018.02); *H04W 8/02* (2013.01); *H04W 48/18* (2013.01); *H04W 60/00* (2013.01)

(58) Field of Classification Search
CPC ....... H04W 76/10; H04W 8/02; H04W 48/18; H04W 60/00; H04W 8/24; H04W 12/084;
(Continued)

(56) References Cited

U.S. PATENT DOCUMENTS

2010/0323716 A1    12/2010   Jaffri
2013/0223233 A1*    8/2013   Zhao ..................... H04W 48/16
                                                     370/241.1
(Continued)

FOREIGN PATENT DOCUMENTS

CN           1325242        12/2001
CN         102761863        10/2012
(Continued)

OTHER PUBLICATIONS

Huawei et al., "Study on User Consent for 3GPP services", 3GPP TSG-SA WG3 Meeting #100e, draft S3-201736-r1, Aug. 28, 2020, 3 sheets.
(Continued)

*Primary Examiner* — Ayaz R Sheikh
*Assistant Examiner* — Mang Boi Thawng
(74) *Attorney, Agent, or Firm* — Fay Kaplun & Marcin, LLP

(57) ABSTRACT

The exemplary embodiments relate to a user equipment (UE) providing an indication of user consent to a network for access to UE information. The UE may perform operations including transmitting an indication of user consent to a first network. The user consent corresponds to a network function acquiring UE information. The operations also include transmitting the UE information to the first network and establishing a connection with a second network. The network function performs operations related to establishing the connection between the UE and the second network using the UE information.

18 Claims, 8 Drawing Sheets

(51) Int. Cl.
*H04W 48/18* (2009.01)
*H04W 60/00* (2009.01)

(58) Field of Classification Search
CPC ... H04W 12/106; H04W 80/02; H04W 12/06; H04W 12/63; H04W 12/037; H04W 76/12; H04L 61/4511
See application file for complete search history.

(56) References Cited

U.S. PATENT DOCUMENTS

| | | | | |
|---|---|---|---|---|
| 2013/0281063 | A1* | 10/2013 | Jactat | H04W 60/00 455/411 |
| 2015/0312767 | A1 | 10/2015 | Jactat et al. | |
| 2016/0014630 | A1* | 1/2016 | Xu | H04W 76/11 370/252 |
| 2017/0257809 | A1* | 9/2017 | Fang | H04W 36/14 |
| 2019/0281649 | A1 | 9/2019 | Moisanen et al. | |
| 2019/0373441 | A1* | 12/2019 | Ryu | H04W 48/18 |
| 2019/0387448 | A1* | 12/2019 | Stauffer | H04W 36/08 |
| 2020/0052999 | A1 | 2/2020 | Lee | |
| 2020/0196130 | A1 | 6/2020 | Tamura | H04W 8/02 |
| 2021/0111953 | A1* | 4/2021 | Hall | H04L 41/0806 |
| 2021/0176613 | A1* | 6/2021 | Purkayastha | H04W 4/02 |
| 2021/0282012 | A1* | 9/2021 | Lee | H04L 63/0807 |
| 2022/0038897 | A1* | 2/2022 | Liu | H04W 60/00 |
| 2022/0174483 | A1* | 6/2022 | Tiwari | H04W 12/06 |
| 2022/0263832 | A1* | 8/2022 | Gupta | H04L 63/0838 |
| 2023/0319533 | A1* | 10/2023 | Ly | H04L 43/04 709/224 |

FOREIGN PATENT DOCUMENTS

| | | |
|---|---|---|
| CN | 103314612 | 9/2013 |
| CN | 103385019 | 11/2013 |
| CN | 109547317 | 3/2019 |
| CN | 110198516 | 9/2019 |
| CN | 111324877 | 6/2020 |
| WO | 2008/154052 | 12/2008 |
| WO | 2015/131379 | 9/2015 |
| WO | 2018/093380 | 5/2018 |
| WO | 2019/118964 A1 | 6/2019 |
| WO | 2020/066890 | 4/2020 |

OTHER PUBLICATIONS

CATT, "Discussion on solutions about the continuity of MDT", 3GPP TSG RAN WG3 Meeting #76, R3-121080, May 12, 2012, 4 sheets.

3GPP; Technical Specification Group Services and System Aspects; Study on enhancement of support for Edge Computing in 5G core network (5GC) (Release 17), Sep. 10, 2020, 232 sheets.

Intel, "Solution for key issue #6", 3GPP TSG SA WG2 Meeting #127, S2-183296, Apr. 10, 2018, 3 sheets.

Samsung Electronics, "Pseudo-CR on Taking user's consent for capability exposure"; 3GPP TSG-SA WG6 Meeting #32; S6-191579; Jul. 12, 2019; 2 sheets.

Samsung Electronics, "Pseudo-CR on Taking user's consent for capability exposure"; 3GPP TSG-SA WG6 Meeting #32; S6-191492; Jul. 12, 2019; 1 sheet.

Samsung Electronics, "Pseudo-CR on Taking user's consent for capability exposure"; 3GPP TSG-SA WG6 Meeting #32; S6-191368; Jul. 12, 2019; 5 sheets.

3rd Generation Partnership Project; Technical Specification Group Services and Systen Aspects; Procedures for the 5G System (5GS); Stage 2 (Release 16). 3GPP TS 23.502 V16.5.1, Aug. 2020, 594 sheets.

* cited by examiner

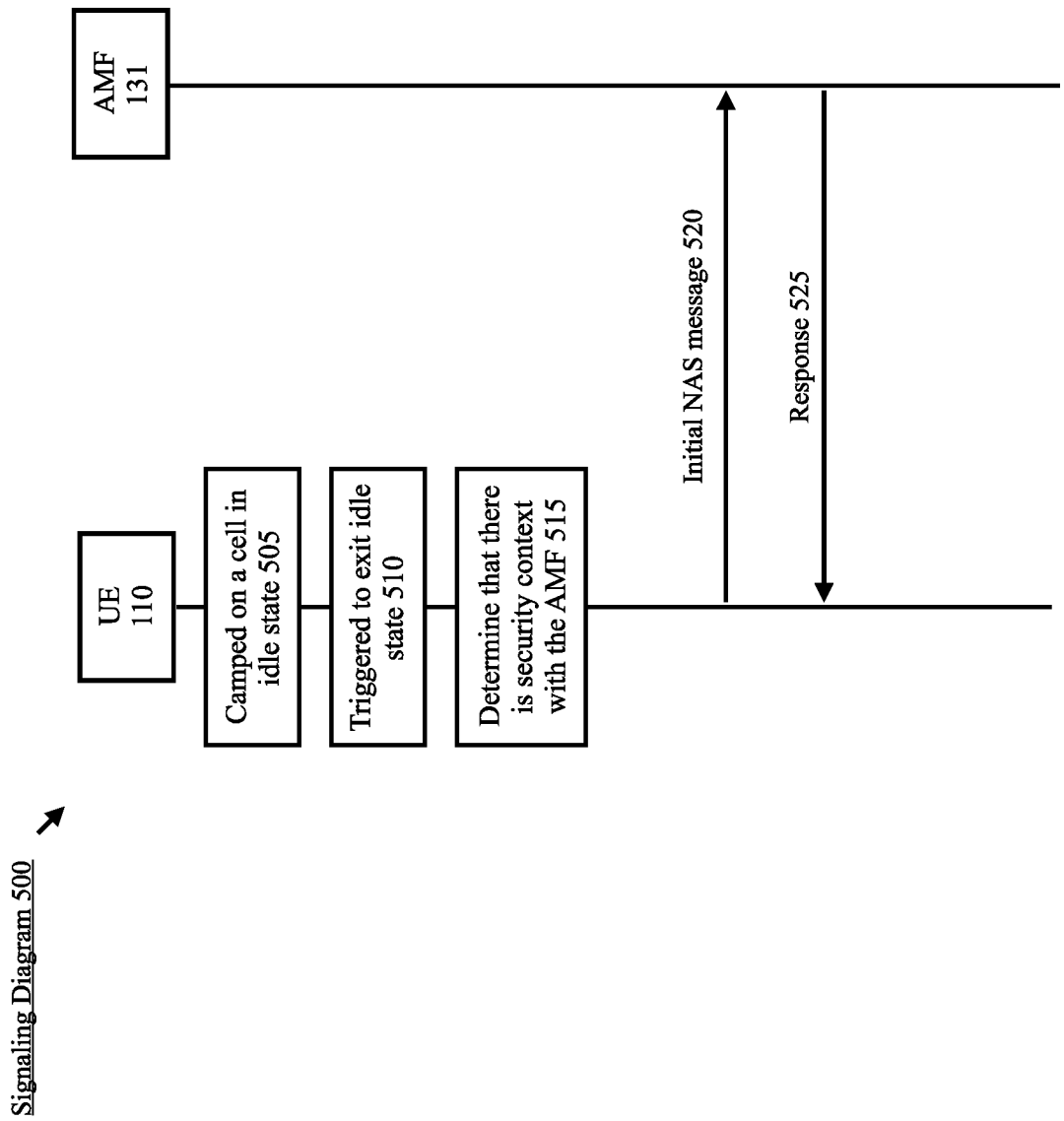

SECURITY PROTECTION ON USER CONSENT FOR EDGE COMPUTING

BACKGROUND

A user equipment (UE) may connect to an edge data network to access edge computing services. Edge computing refers to performing computing and data processing at the network where the data is generated. When connected, application data may flow between the UE and an edge application server (EAS) of the edge data network.

A cellular network may perform operations related to establishing the connection between the UE and the EAS of the edge data network. For example, the cellular network may access UE location information and determine an appropriate packet data unit (PDU) session anchor (PSA) for that UE location. However, the network may obtain user consent for access to the UE location information prior to accessing the UE location information.

SUMMARY

Some exemplary embodiments are related to a baseband processor configured to perform operations. The operations include transmitting an indication of user consent to a first network. The user consent corresponds to a network function acquiring UE information. The operations also include transmitting the UE information to the first network and establishing a connection with a second network. The network function performs operations related to establishing the connection between the UE and the second network using the UE information.

Other exemplary embodiments are related to user equipment (UE) including a transceiver configured to communicate with multiple networks and a processor communicatively coupled to the transceiver and configured to perform operations. The operations include transmitting an indication of user consent to a first network. The user consent corresponds to a network function acquiring UE information. The operations also include transmitting the UE information to the first network and establishing a connection with a second network. The network function performs operations related to establishing the connection between the UE and the second network using the UE information.

Still further exemplary embodiments are related to a method performed by a user equipment (UE). The method includes transmitting an indication of user consent to a first network. The user consent corresponds to a network function acquiring UE information. The operations also include transmitting the UE information to the first network and establishing a connection with a second network. The network function performs operations related to establishing the connection between the UE and the second network using the UE information.

BRIEF DESCRIPTION OF THE DRAWINGS

FIG. 5*a* shows a signaling diagram for the UE to provide the indication of user consent to the network during the initial registration procedure according to various exemplary embodiments.

DETAILED DESCRIPTION

Figure 1:
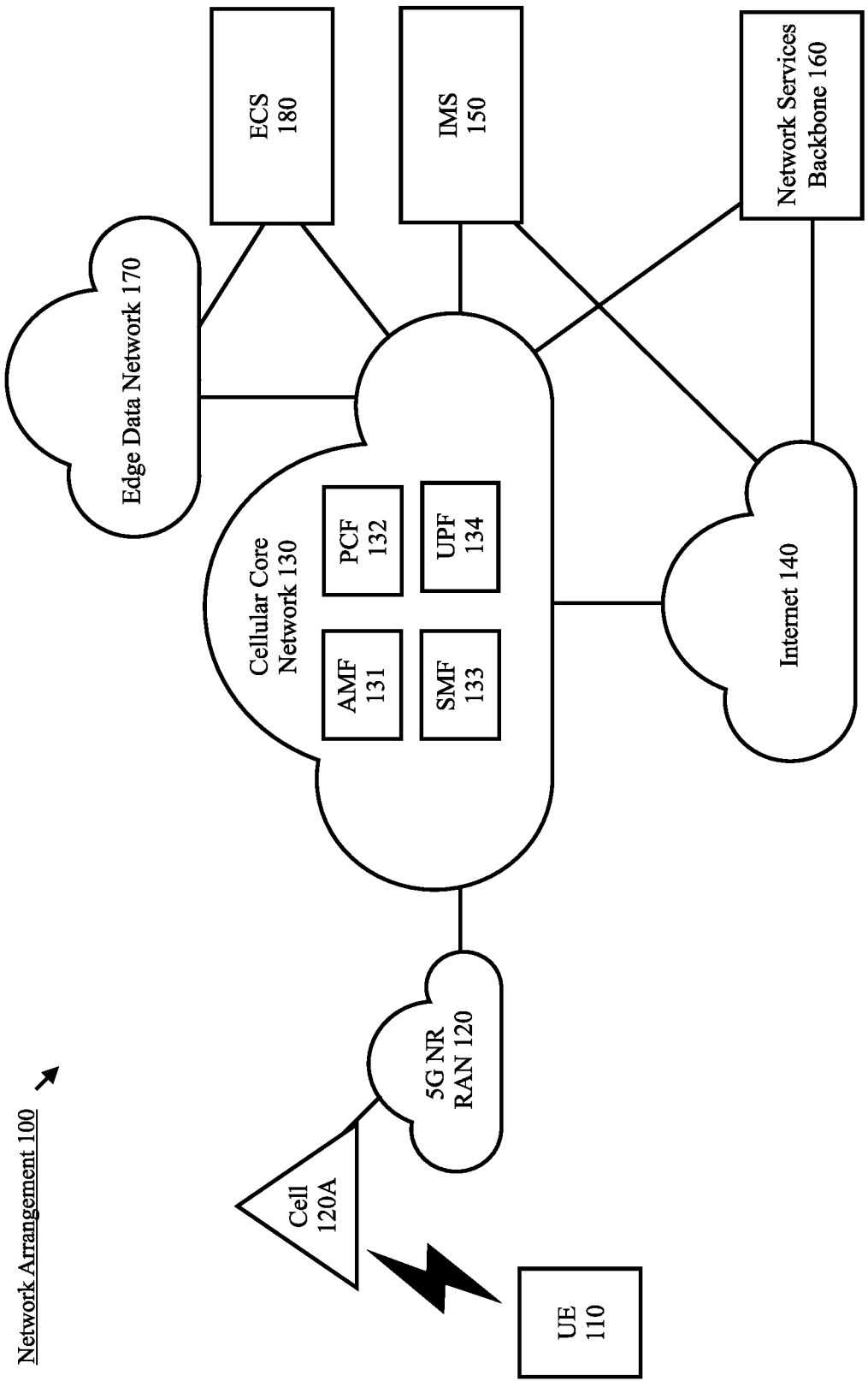
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) providing an indication of user consent to the network for access to UE information.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

In addition, the exemplary embodiments are described with regard to edge computing (EC). The UE may access an edge data network via a 5G NR network. The edge data network may provide the UE with access to edge computing services. Edge computing generally refers to performing computing and data processing at the network where the data is generated. In contrast to legacy approaches that utilize a centralized architecture, edge computing is a distributed approach where data processing is localized towards the network edge, closer to the end user. This allows performance to be optimized and latency to be minimized.

The 5G NR network may collect UE location information to facilitate the establishment of the connection between UE and an edge application server (EAS) of the edge data network. However, the 5G NR network may be configured to receive user consent prior to accessing the UE location information. The exemplary embodiments relate to the UE providing the 5G NR network with an indication of user consent that the network is authorized to access the UE location information. As will be described in more detail below, the exemplary embodiments include various techniques for providing an indication of user consent to the 5G NR network in a protected message. These techniques may ensure that the indication of user consent is not modified when the indication is sent to the network and thus, the corresponding UE information is not disclosed to unauthorized entities.

Throughout this description, the term "user consent" generally refers to an indication that a user of the UE has authorized the network to access one or more types of UE information and/or perform an operation associated with the UE. This indication may be based on user input, a preconfigured setting, an agreement between the user and the network carrier, an agreement between the user and a third party or any other appropriate factor. In some examples, user consent is described as corresponding to network access to UE location information. However, reference to UE location information is merely provided for illustrative purposes, the exemplary embodiments may apply to user consent that is associated with any type of UE information, feature and/or operation.

FIG. 1 shows an exemplary network arrangement 100 according to various exemplary embodiments. The exemplary network arrangement 100 includes UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, an LTE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB. However, an actual network arrangement may include any number of different types of cells being deployed by any number of RANs. Thus, the example of a single cell 120A is merely provided for illustrative purposes.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cells 120A). However, as mentioned above, reference to the 5G NR-RAN 120 is merely for illustrative purposes and any appropriate type of RAN may be used.

The network arrangement 100 also includes a cellular core network 130. The cellular core network 130 may be considered to be the interconnected set of components that manages the operation and traffic of the cellular network. In this example, the components include an access and mobility management function (AMF) 131, a policy control function (PCF) 132, a session management function (SMF) 133 and a user plane function (UPF) 134. However, an actual cellular core network may include various other components performing any of a variety of different functions.

The AMF 131 performs operations related to mobility management such as, but not limited to, paging, non-access stratum (NAS) management and registration procedure management between the UE 110 and the cellular core network 130. Reference to a single AMF 131 is merely for illustrative purposes, an actual network arrangement may include any appropriate number of AMFs.

The PCF 132 performs operations related to the control plane such as, but not limited to, managing policy rules for control plane functions including network slicing, roaming and mobility management. Reference to a single PCF 132 is merely for illustrative purposes, an actual network arrangement may include any appropriate number of PCFs.

The SMF 133 performs operations related to session management such as, but not limited to, session establishment, session release, IP address allocation, policy and quality of service (QoS) enforcement, etc. The SMF 133 may be equipped with one or more communication interfaces to communicate with other network components (e.g., network functions, RANs, UEs, etc.). The exemplary embodiments are not limited to an SMF that performs the above reference operations. Those skilled in the art will understand the variety of different types of operations a SMF may perform. Further, reference to a single SMF 133 is merely for illustrative purposes, an actual network arrangement may include any appropriate number of SMFs.

The UPF 134 performs operations related packet data unit (PDU) session management. For example, the UPF 134 may facilitate a connection between the UE 110 and the edge data network 170. The UPF 134 may be equipped with one or more communication interfaces to communicate with other networks and/or network components (e.g., network functions, RANs, UEs, etc.). The exemplary embodiments are not limited to an UPF that performs the above reference operations. Those skilled in the art will understand the variety of different types of operations an UPF may perform. Further, reference to a single UPF 134 is merely for illustrative purposes, an actual network arrangement may include any appropriate number of UPFs.

The network arrangement 100 also includes the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In addition, the network arrangement 100 includes an edge data network 170 and an edge configuration server (ECS) 180. The exemplary embodiments are described with regard to implementing an authentication and authorization procedure between the UE 110 and the ECS 180. The edge data network 170 and an ECS 180 will be described in more detail below with regard to FIG. 3.

Figure 2:
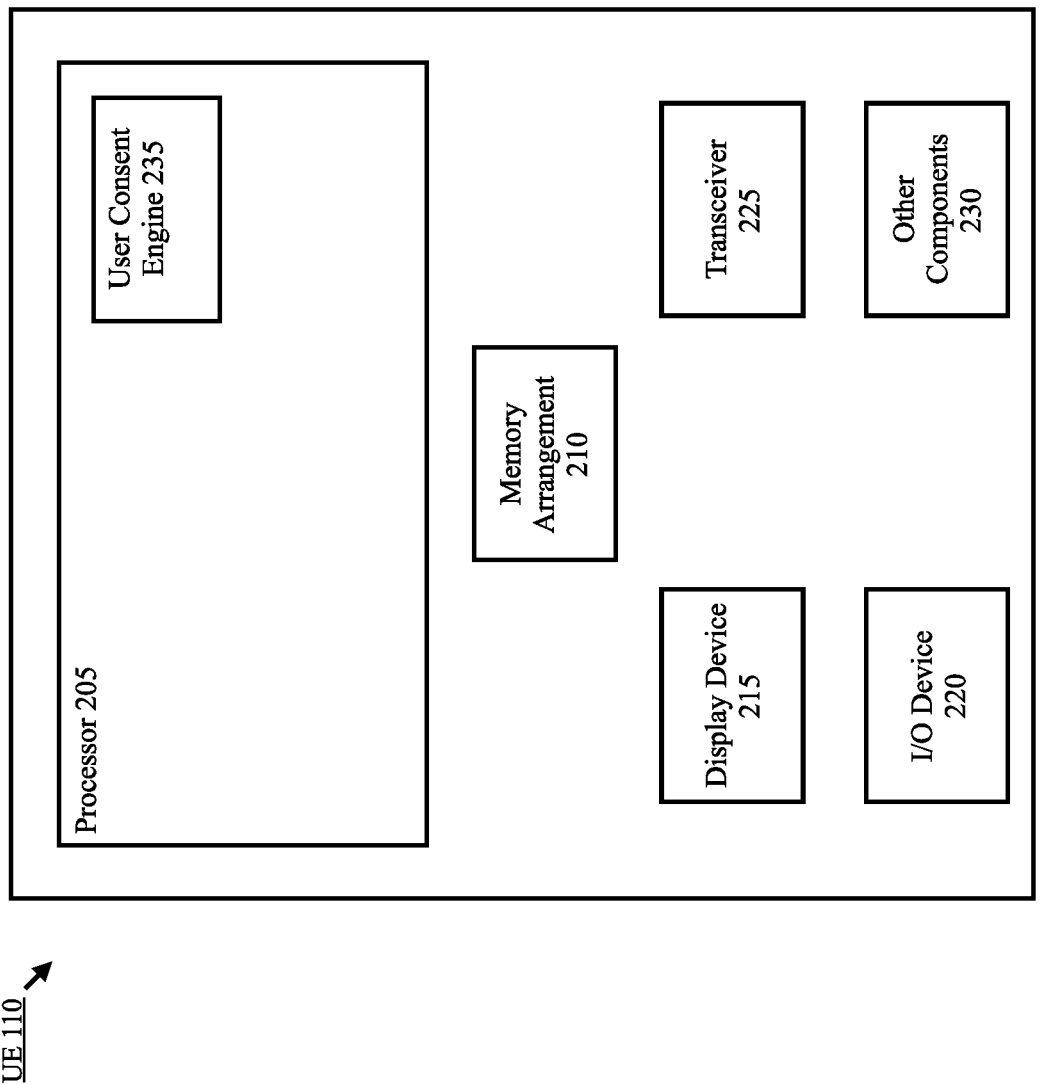
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute various types of software. For example, the processor may execute a user consent engine 235. The user consent engine 235 may perform various operations related to providing an indication of user consent to the network for network access to UE location information.

The above referenced engine being executed by the processor 205 is only exemplary. The functionality associated with the software may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
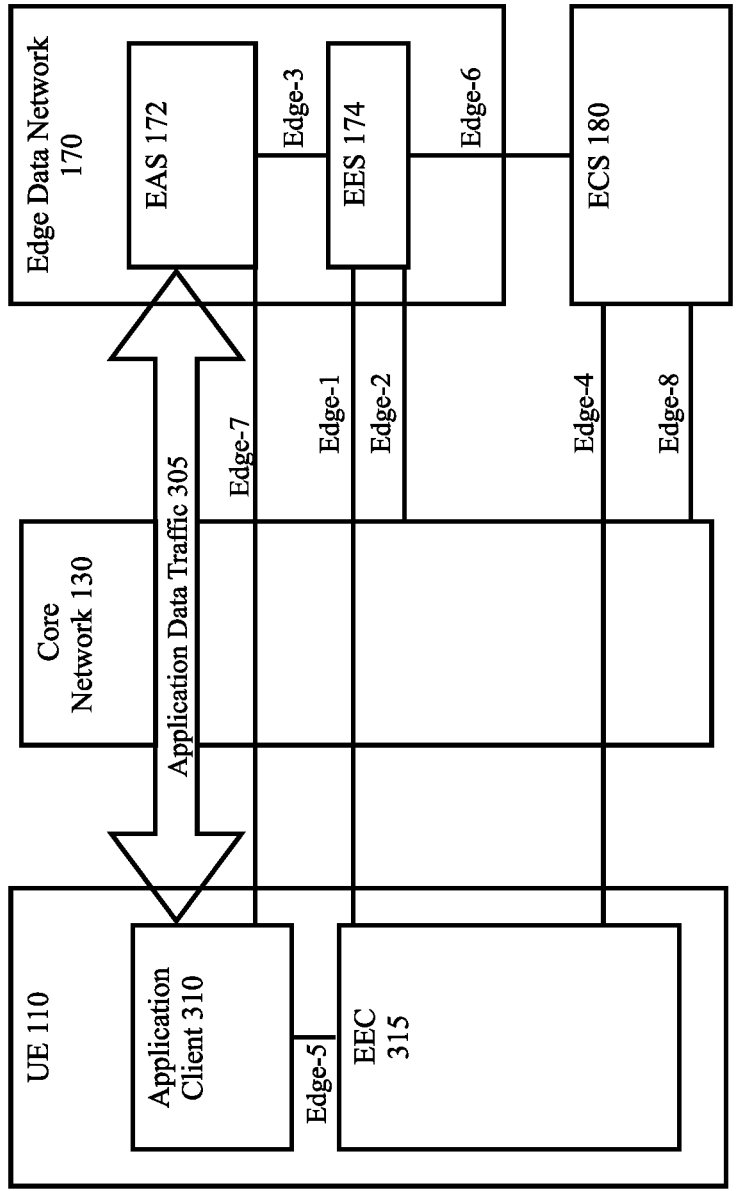
FIG. 3 shows an architecture for enabling edge applications according to various exemplary embodiments.

FIG. 3 shows an architecture 300 for enabling edge applications according to various exemplary embodiments. The architecture 300 will be described with regard to the network arrangement 100 of FIG. 1.

The architecture 300 provides a general example of the type of components that may interact with one another to facilitate the exchange of application data traffic with the edge data network 170. The architecture 300 includes the UE 110, the core network 130 and the edge data network 170. The UE 110 may establish a connection to the edge data network 170 via the core network 130 and various other components (e.g., cell 120A, the 5G NR RAN 120, network functions, etc.).

In the architecture 300, the various components are shown as being connected via reference points labeled edge-x (e.g., edge-1, edge-2, edge-3, edge-4, edge-5, edge-6, edge-7, edge-8, etc.). Those skilled in the art will understand that each of these reference points (e.g., connections, interfaces, etc.) are defined in the 3GPP Specifications. The exemplary architecture arrangement 300 is using these reference points in the manner in which they are defined in the 3GPP Specifications. Furthermore, while these interfaces are termed reference points throughout this description, it should be understood that these interfaces are not required to be direct wired or wireless connections, i.e., the interfaces may communicate via intervening hardware and/or software components. To provide an example, the UE 110 exchanges communications with the gNB 120A. However, in the architecture 300 the UE 110 is shown as having a connection to the ECS 180. However, this connection is not a direct communication link between the UE 110 and the ECS 180. Instead, this is a connection that is facilitated by intervening hardware and software components. Thus, throughout this description the terms "connection," "reference point" and "interface" may be used interchangeably to describe the interfaces between the various components in the architecture 300 and the network arrangement 100.

During operation, application data traffic 305 may flow between an application client 310 executing on the UE 110 and the edge application server (EAS) 172 of the edge data network 170. The EAS 172 may be accessed through the core network 130 via uplink classifiers (CL) and branching points (NP) or in any other appropriate manner. Those skilled in the art will understand the variety of different types of operations and configurations relevant to an application client and an EAS. The operations performed by these components are beyond the scope of the exemplary embodiments. Instead, these components are included in the description of the architecture 300 to demonstrate an example of how the flow of application data traffic 305 between the UE 110 and the edge data network 170 may be achieved after user consent is provided.

The UE 110 may also include an edge enabler client (EEC) 315 that may be configured to provide supporting functions for the application client 310. For example, the EEC 315 may perform operations related to concepts such as, but not limited to, the discovery of EASs that are available in an edge data network (e.g., EAS 172) and the retrieval and provisioning of configuration information that may enable the exchange of the application data traffic 305 between the application client 310 and the EAS 172. To differentiate the EEC 315 from other EECs, the EEC 315 may be associated with a globally unique value (e.g., EEC ID) that identifies the EEC 315. Further, reference to a single application client 310 and EEC 315 is merely provided for illustrative purposes, the UE 110 may be equipped with any appropriate number of application clients and EECs.

The edge data network 170 may also include an edge enabler server (EES) 174. The EES 174 may be configured to provide supporting functions to the EAS 172 and the EEC 315 running on the UE 110. For example, the EES 174 may perform operations related to concepts such as, but not limited to, provisioning configuration to enable the exchange of the application data traffic 305 between the UE 110 and the EAS 172 and providing information related to the EAS 172 to the EEC 315 running on the UE 110. Those skilled in the art will understand the variety of different types of operations and configurations relevant to an EES. Further, reference to the edge data network 170 including a single EAS 172 and a single EES 174 is merely provided for illustrative purposes. In an actual deployment scenario, an edge data network may include any appropriate EASs and EESs interacting with any number of UEs.

The ECS 180 may be configured to provide supporting functions for the EEC 315 to connect to the EES 174. For example, the ECS 180 may perform operations related to concepts such as, but not limited to, provisioning of edge configuration information to the EEC 315. The edge configuration information may include, the information for the EEC 315 to connect to the EES 174 (e.g., service area information, etc.) and the information for establishing a connection with the EES 174 (e.g., uniform resource identifier (URI). Those skilled in the art will understand the variety of different types of operations and configurations relevant to an ECS.

In the network architecture 100 and the architecture 300, the ECS 180 is shown as being outside of the edge data network 170 and the core network 130. However, this is merely provided for illustrative purposes. The ECS 180 may be deployed in any appropriate virtual and/or physical location (e.g., within the mobile network operator's domain or within a third party domain) and implemented via any appropriate combination of hardware, software and/or firmware.

Figure 4:
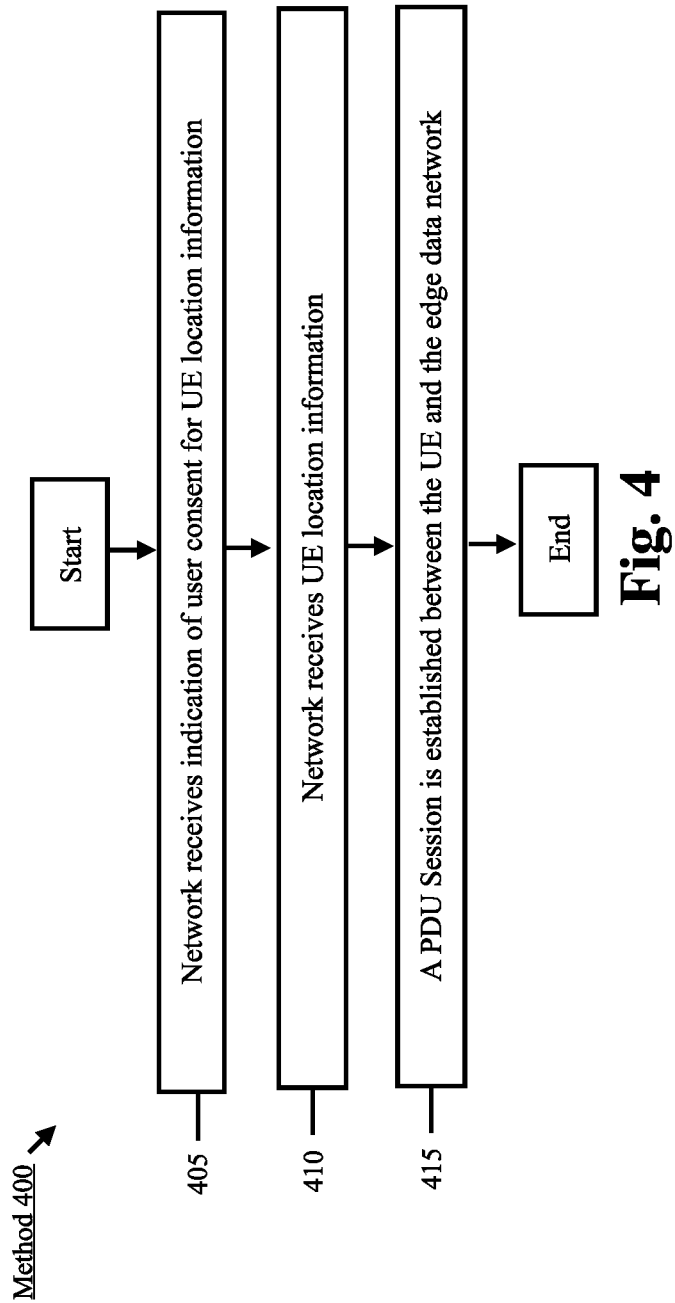
FIG. 4 shows a method for using UE location information to establish a connection between the UE and the edge data network according to various exemplary embodiments.

FIG. 4 shows a method 400 for using UE location information to establish a connection between the UE 110 and the edge data network 170 according to various exemplary embodiments. The method 400 will be described with regard to the network arrangement 100 of FIG. 1 and the UE 110 of FIG. 2.

In 405, the network receives an indication of user consent from the UE 110 for UE location data. This indication may be received in any appropriate message. As mentioned above, the user consent may indicate that the network is authorized to access UE location information. Specific examples of how the network receives the indication of user consent will be provided in more detail below after the description of the method 400. The method 400 provides a general overview of how the 5G NR network may facilitate a connection between the UE 110 and the edge data network 170 using UE location information. Thus, the operations described in the method 400 may precede the flow of application data traffic 305.

In 410, the network receives UE location information from the UE 110. In some embodiments, the SMF 133 or any other network function may be configured to ensure that user consent is acquired before UE location information is accessed by the network. As will be described below, the UE location information may be used to establish a connection between the UE 110 and the edge data network 170.

In this example, a domain name system (DNS) application function (AF) running on the core network 130 may perform various operations related to establishing a connection between the UE 110 and the edge data network 170. These operations may include, but are not limited to, receiving a UE DNS request for a fully qualified domain name (FQDN) related to the EAS 172, authorizing the UE 110 and service, receiving UE location information (e.g., 410) and determining at least one suitable local PDU session anchor (PSA) point for that UE location and application.

There are several ways in which the AF may acquire the UE location information. In one example, the AF may request the UE location from the PCF 132, the PCF 132 may forward the request to the SMF 133 and then the SMF 133 may subscribe to the Namf_EventExposure service. In another example, the AF may request UE location information from the PCF 132, the PCF 132 may forward the request to the SMF 133 and then the AMF 131 may send the UE location information to the SMF 133 in a Nsmf_PDUSession_updateSMContext message. In a further example, the AF may subscribe to UE location information from the core network 130. However, any reference to the network receiving UE location information in any particular manner is merely provided for illustrative purposes. The exemplary techniques described herein for providing user consent to the network may precede the collection of UE location information performed in any particular manner.

In 415, a PDU session is established between the UE 110 and the EAS 172. Continuing with the example provided above, using the UE location information and the FQDN, the DNS AF may obtain the preferred locations for the N6 access to the edge data network 170 for the corresponding application (e.g., application client 310) and the corresponding subnets (or full internet protocol (IP) addresses) after NAT using the SLA based EC translation table. Thus, the DNS AF and the components shown in the enabling architecture 300 may work together to establish the PDU session between the UE 110 and the EAS 172.

In a first aspect, the exemplary embodiments relate to utilizing an initial registration for providing an indication of user consent to the network. In other words, the exemplary embodiments leverage the protected messages utilized in the initial registration procedure to provide security to the indication of user consent. As will be described below, the signaling that occurs during the registration procedure may be dependent on whether the UE 110 and the AMF 131 have the appropriate security context.

FIG. 5a shows a signaling diagram 500 for the UE 110 to provide the indication of user consent to the network during the initial registration procedure according to various exemplary embodiments.

As indicated above, the UE 110 may send the indication of user consent to authorize the AF acquiring UE location information during the initial registration procedure. Those skilled in the art will understand that the initial registration procedure may occur between the UE 110 and the AMF 131. Thus, signaling diagram 500 includes the UE 110 and the AMF 131.

In 505, the UE 110 is camped on a cell and in an idle state. In 510, the UE 110 is triggered to exit the idle state.

In 515, the UE 110 determines that there is a security context between the UE 110 and the AMF 131. In accordance with the initial registration procedure, when the UE 110 has a NAS security context, the UE 110 sends a message that has the complete initial NAS message ciphered in a NAS container along with cleartext information elements (IEs) and the whole message integrity is protected. Those skilled in the art will understand that the initial NAS message refers to the first NAS message that is sent after the UE 110 transitions from the idle state (e.g., a service request, mobility registration, etc.).

In 520, the UE 110 may transmit the initial NAS message to the AMF 131. In this example, the UE 110 includes the indication of user consent ciphered in the NAS container. Thus, the UE 110 leverages the initial registration procedure to provide the indication of user context to the AMF 131. In 525, the AMF 131 may transmit a response to the initial NAS message indicating that the AMF 131 has received the initial NAS message.

Figure 5B:
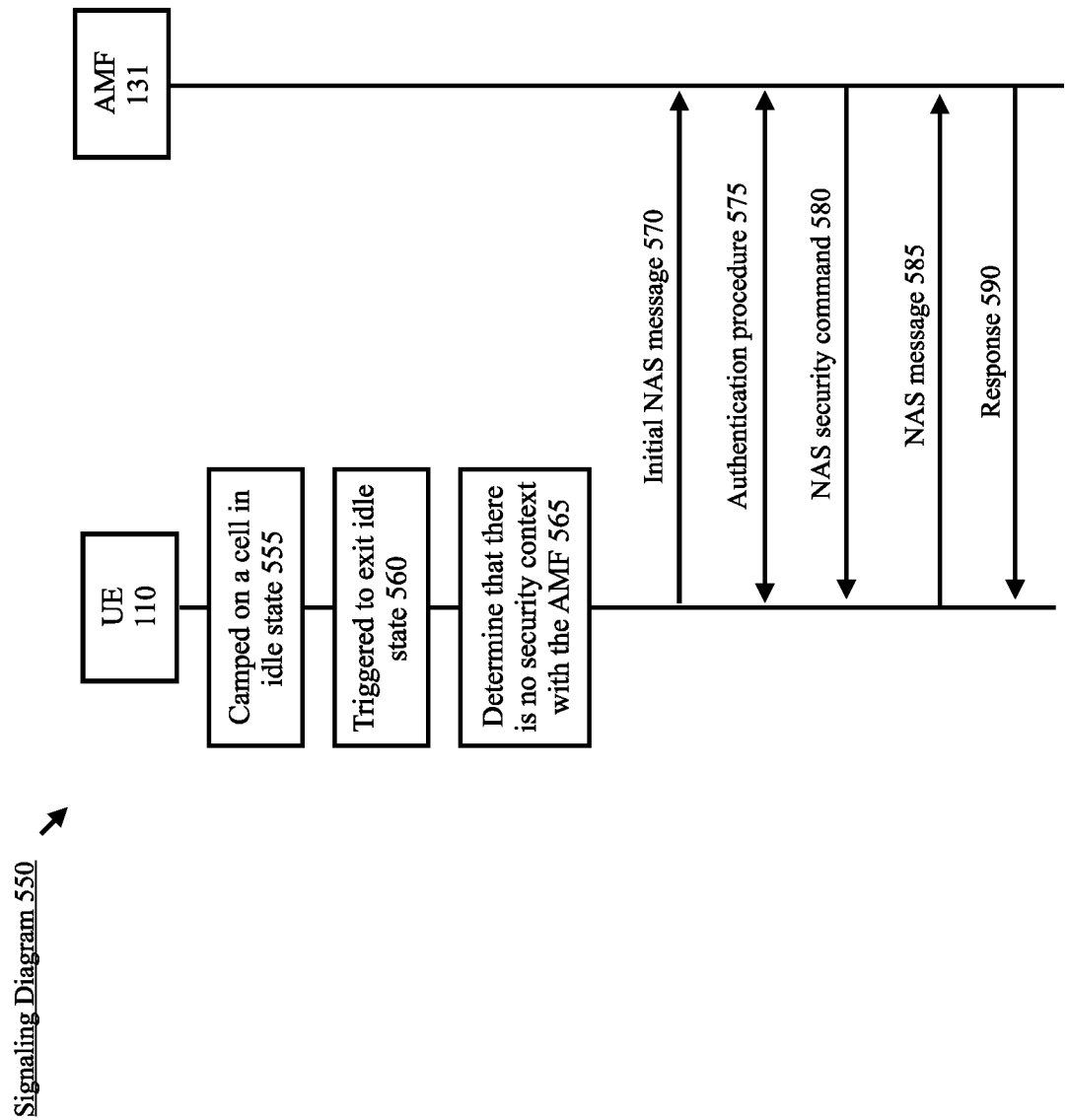
FIG. 5*b* shows a signaling diagram for the UE to provide the indication of user consent to the network during the initial registration procedure according to various exemplary embodiments.

FIG. 5b shows a signaling diagram 550 for the UE 110 to provide the indication of user consent to the network during the initial registration procedure according to various exemplary embodiments. Like the signaling diagram 500, the signaling diagram 550 includes the UE 110 and the AMF 131.

In 555, the UE 110 is camped on a cell and in an idle state. In 560, the UE 110 is triggered to exit the idle state.

In 565, the UE 110 determines that there is no security context between the UE 110 and the AMF 131. In 570, in accordance with the initial registration procedure, the UE 110 may send an initial NAS message to the AMF 131 that includes multiple cleartext IEs. These cleartext IEs may be used to establish the security context between the UE 110 and the AMF 131. However, since the cleartext IEs are not protected, the indication of user consent is not included in the cleartext IEs.

In 575, the UE 110 and the AMF 131 may perform an authentication procedure to establish a security context. In 580, the AMF 131 may transmit a NAS security command to the UE 110. In 585, the UE 110 may transmit a NAS message to the AMF 131 in response to the NAS security command. In this example, the NAS message includes the indication of user consent ciphered in the NAS container. Thus, the UE 110 leverages the initial registration procedure to provide the indication of user context to the AMF 131. In 590, the AMF 131 may transmit a response to the initial NAS message indicating that the AMF 131 has received the initial NAS message.

The exemplary embodiments are not limited to an initial registration procedure performed in the manner described above with regard to FIGS. 5a-5b. Those skilled in the art will understand that the exemplary concepts described herein may be applicable to current implementations of initial registration procedures and future implementations of initial registration procedures.

In a second aspect, the exemplary embodiments relate to utilizing a UE configuration update procedure for providing an indication of user consent to the network. For example, the exemplary embodiments leverage the protected messages utilized in the UE configuration update procedure to provide security to the indication of user consent.

Figure 6:
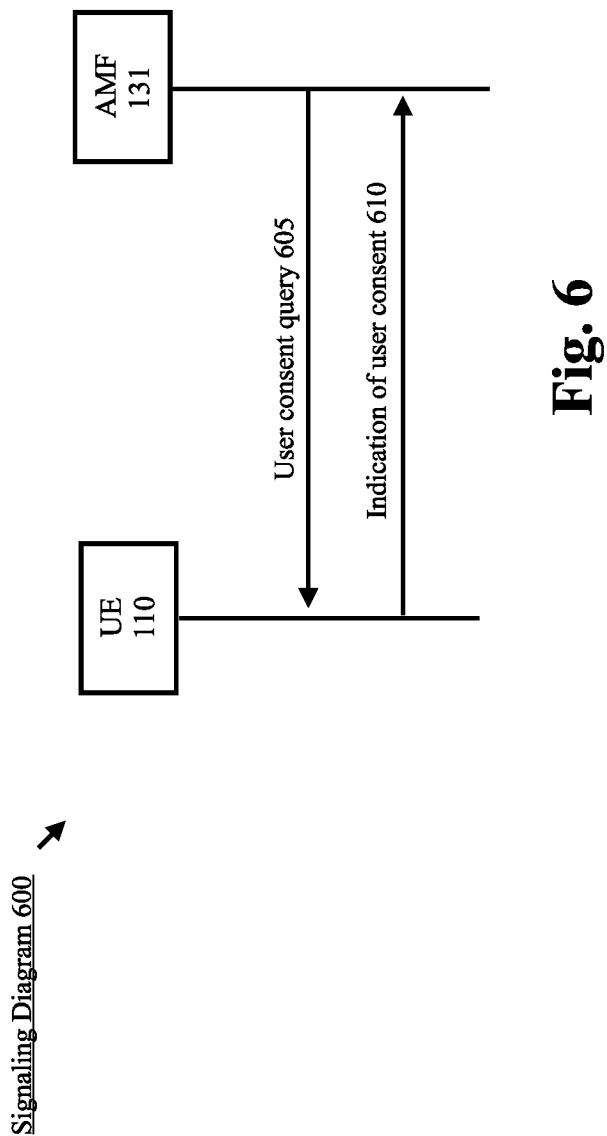
FIG. 6 shows a signaling diagram for the UE 110 to provide the indication of user consent to the network during the UE configuration update procedure according to various exemplary embodiments.

FIG. 6 shows a signaling diagram 600 for the UE 110 to provide the indication of user consent to the network during the UE configuration update procedure according to various exemplary embodiments.

Those skilled in the art will understand that the UE configuration update procedure may include a signaling exchange between the UE 110 and the AMF 131.

In 605, the AMF 131 transmits a user consent query to the UE 110. In this example, the AMF 131 may include a user consent query for allowing the AF to acquire UE location information in a UE configuration update command. In other embodiments, instead of the UE configuration update command, the user consent query may be included in any appropriate message that is used for the delivery of UE policies.

In 610, the UE 110 transmits an indication of user consent to the AMF 131. In some embodiments, the UE 110 may include the indication of user consent in the UE configuration update complete message. In other embodiments, instead of the UE configuration update complete message, the user consent may be included in any appropriate message that is used to provide the results of the delivery of UE policies. Thus, the UE 110 leverages the UE configuration update procedure to provide the indication of user context to the AMF 131.

The exemplary embodiments are not limited to the UE configuration update procedure performed in the manner described above with regard to FIG. 6. Those skilled in the art will understand that the exemplary concepts described herein may be applicable to current implementations of UE configuration update procedures and future implementations of UE configuration update procedures.

In a third aspect, the exemplary embodiments relate to utilizing PDU session establishment for providing an indication of user consent to the network. For example, the exemplary embodiments leverage the protected messages utilized in PDU session establishment to provide security to the indication of user consent.

Figure 7:
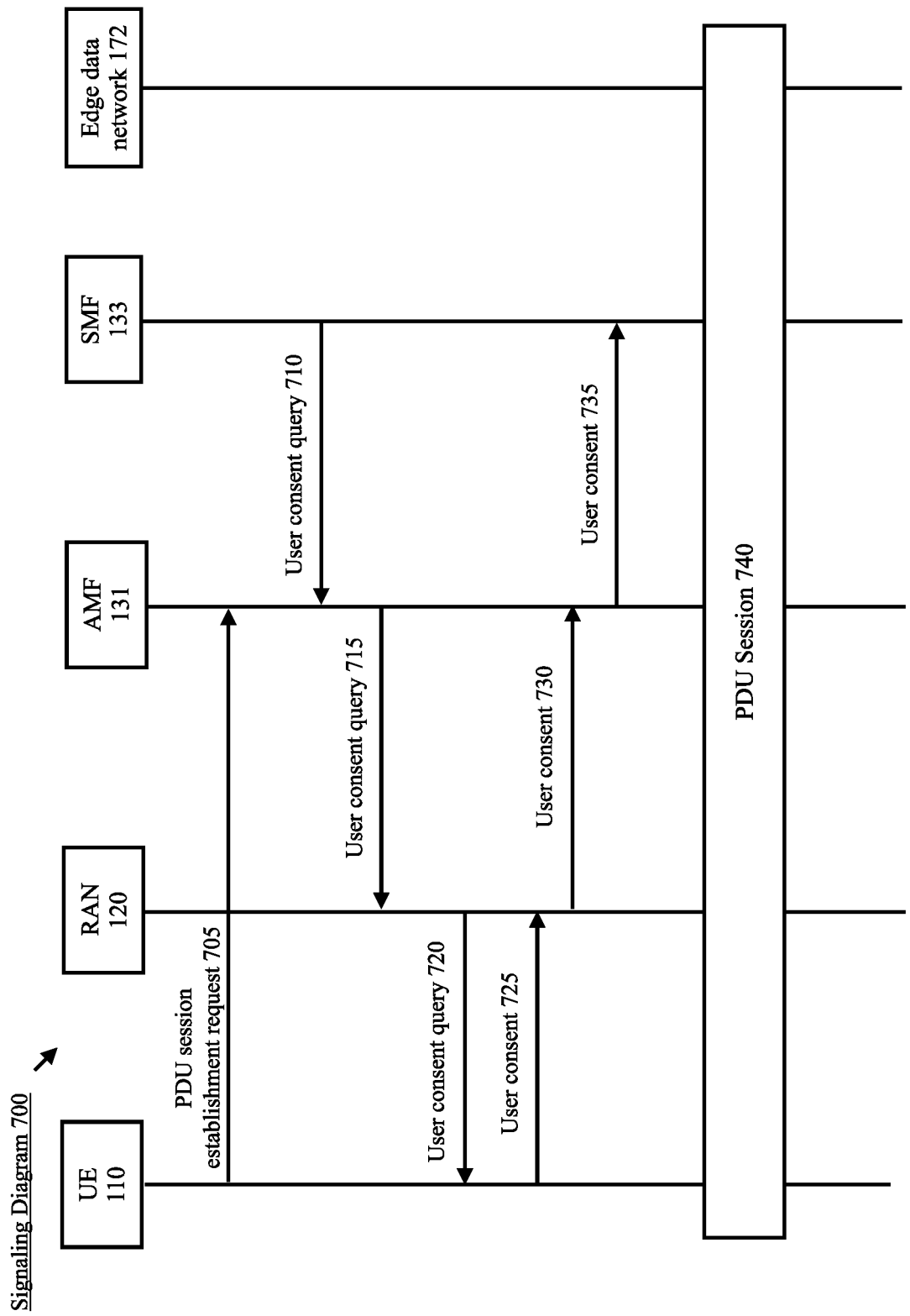
FIG. 7 shows a signaling diagram for the UE to provide the indication of user consent to the network during packet data unit (PDU) session establishment according to various exemplary embodiments.

FIG. 7 shows a signaling diagram 700 for the UE 110 to provide the indication of user consent to the network during PDU session establishment according to various exemplary embodiments.

During PDU session establishment, the SMF 133 provides edge configuration server information (e.g., one or more FQDNs and/or IP address(es) of edge configuration servers) to the UE 110. The UE 110 may provide an indication of requesting edge configuration server information in the PDU session establishment request. The exemplary embodiments relate to providing the indication of user consent to the network before PDU session establishment is complete.

The signaling diagram 700 includes the UE 110, the RAN 120, the AMF 131, the SMF 133 and the edge data network 172. Those skilled in the art will understand that an actual PDU session establishment procedure may include other network components and signaling that is not shown in the signaling diagram 700. Thus, the exemplary embodiments are not limited to the PDU session establishment performed in the manner described above with regard to FIG. 7. Those skilled in the art will understand that the exemplary concepts described herein may be applicable to PDU session establishment and future implementations of PDU session establishment.

In 705, the UE 110 transmits a PDU session establishment request to the AMF 131. In some embodiments, the UE 110 may include an indication of user consent in the PDU session establishment request. Thus, the UE 110 may provide the indication of user consent even without receiving a query from the AMF 131.

In 710, the SMF 133 transmits a user consent query to the AMF 131. For example, the SMF 133 may transmit a Namf_Communication_N1N2Message transfer to the AMF 131.

In 715, the AMF 131 may forward the user consent query to the RAN 120. For example, the AMF 131 may transmit a N2 PDU session Request to the RAN that includes the user consent query.

In 720, the RAN 120 transmits the user consent query to the UE 110. For example, the RAN 120 may incorporate the user consent query into a radio resource control (RRC) connection reconfiguration message. In 725, the UE 110 transmits the user consent response (agree or not) to the RAN 120. In this example, the user consent response indicates that the network is authorized to access the UE location data.

In 730, the RAN 120 transmits the indication of user consent to the AMF 131. For example, the RAN 120 may transmit a N2 PDU session response including the user consent to the AMF 131.

In 735, the AMF 131 may forward the indication of user consent to the SMF 133 using any appropriate message. At this time, in some embodiments, only the SMF 133 may send user sensitive information to the AF after it receives the indication of user consent. In 740, a PDU session is established between the UE 110 and the edge data network 172.

As mentioned above with regard to FIGS. 3-4, various components on the network side and the UE 110 side may work together to establish the PDU session between the UE 110 and the edge data network 172.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A baseband processor configured to perform operations comprising:
   receiving a user equipment (UE) configuration update command including a user consent query for UE location information;
   transmitting an indication of user consent to a first network during a UE configuration update procedure in a UE configuration update complete message between the UE and an access and mobility management function (AMF), the user consent corresponding to a Domain Name System (DNS) Application Function (AF) acquiring UE location information;
   transmitting the UE information to the first network; and
   establishing a connection with an edge data network, wherein the DNS AF performs operations related to establishing the connection using the UE location information.

2. The baseband processor of claim 1, wherein the first network is a 5G new radio (NR) network.

3. The baseband processor of claim 1, wherein the indication of user consent is included in an initial non-access stratum (NAS) message ciphered in a NAS container.

4. The baseband processor of claim 3, wherein the indication of the user consent is not included in a cleartext information element (IE).

5. The baseband processor of claim 1, wherein the operations further comprise:
   receiving the user consent query during PDU session establishment from a session management function (SMF) via the AMF and a currently camped radio access network (RAN).

6. The baseband processor of claim 1, wherein the user consent query includes a request for an application function to acquire the UE location information.

7. A baseband processor configured to perform operations comprising:
   transmitting, to an access and mobility management function (AMF) of a first network, a packet data unit (PDU) session establishment request, wherein the PDU establishment request includes an indication of user consent, the user consent corresponding to a Domain Name System (DNS) Application Function (AF) acquiring UE location information;
   transmitting the UE information to the first network; and
   establishing a connection with an edge data network, wherein the DNS AF performs operations related to establishing the connection using the UE location information.

8. The baseband processor of claim 7, wherein the indication of the user consent is included in a UE configuration update complete message.

9. The baseband processor of claim 7, wherein the user consent query includes a request for an application function to acquire the UE location information.

10. The baseband processor of claim 7, wherein the first network is a fifth generation (5G) new radio (NR) network.

11. The baseband processor of claim 7, wherein the indication of the user consent is not included in a cleartext information element (IE).

12. The baseband processor of claim 7, wherein the operations further comprise:
    receiving the user consent query during PDU session establishment from a session management function (SMF) via the AMF and a currently camped radio access network (RAN).

13. A baseband processor configured to perform operations comprising:
    transmitting, to an access and mobility management function (AMF) of a first network, a first non-access stratum (NAS) message containing multiple cleartext information elements (IEs);
    establishing, after transmitting the first NAS message, a security context with the AMF based on at least the multiple cleartext IEs;
    receiving, after establishing the security context with the UE, a NAS security command from the AMF;
    transmitting a second NAS message in response to the NAS security command, the second NAS message including an indication of user consent ciphered in a NAS container, the user consent corresponding to a network function acquiring UE location information, the user consent corresponding to a Domain Name System (DNS) Application Function (AF) acquiring UE location information;
    transmitting the UE information to the first network; and
    establishing a connection with an edge data network, wherein the DNS AF performs operations related to establishing the connection using the UE location information.

14. The baseband processor of claim 13, wherein the indication of the user consent is included in a UE configuration update complete message.

15. The baseband processor of claim 13, wherein the user consent query includes a request for an application function to acquire the UE location information.

16. The baseband processor of claim 13, wherein the first network is a fifth generation (5G) new radio (NR) network.

17. The baseband processor of claim 13, wherein the indication of user consent is not included in a cleartext information element (IE).

18. The baseband processor of claim 13, wherein the operations further comprise:
    receiving the user consent query during PDU session establishment from a session management function (SMF) via the AMF and a currently camped radio access network (RAN).

* * * * *